(12) United States Patent
Ding et al.

(10) Patent No.: US 11,831,619 B1
(45) Date of Patent: *Nov. 28, 2023

(54) ESTABLISHING CONCEALED COMMUNICATIONS BETWEEN PARTIES

(71) Applicant: Meta Platforms, Inc., Menlo Park, CA (US)

(72) Inventors: Xue Ding, Los Altos, CA (US); Nathan Andrew Sharp, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/383,047

(22) Filed: Jul. 22, 2021

Related U.S. Application Data

(63) Continuation of application No. 16/398,141, filed on Apr. 29, 2019, now Pat. No. 11,102,178.

(51) Int. Cl.
*H04L 9/40* (2022.01)
*G06F 9/451* (2018.01)
*G06F 21/62* (2013.01)

(52) U.S. Cl.
CPC .......... *H04L 63/0421* (2013.01); *G06F 9/451* (2018.02); *G06F 21/6245* (2013.01)

(58) Field of Classification Search
CPC ... H04L 63/0421; G06F 9/451; G06F 21/6245
See application file for complete search history.

(56) References Cited

U.S. PATENT DOCUMENTS

| | | |
|---|---|---|
| D615,546 S | 5/2010 | Lundy et al. |
| D653,286 S | 1/2012 | Hass |
| D661,701 S | 6/2012 | Brown et al. |
| D696,264 S | 12/2013 | d'Amore et al. |
| D701,879 S | 4/2014 | Foit et al. |
| D706,302 S | 6/2014 | Akana et al. |
| D725,134 S | 3/2015 | Boettcher et al. |

(Continued)

OTHER PUBLICATIONS

Ex Parte Quayle Action received for U.S. Appl. No. 29/689,398 dated Oct. 7, 2020, 17 pages.

(Continued)

*Primary Examiner* — Pei Yong Weng
(74) *Attorney, Agent, or Firm* — Greenberg Traurig, LLP

(57) ABSTRACT

The disclosed computer-implemented method may include receiving an input from a user identifying specified persons that are to be included in a concealed list of persons. The specified persons may be unaware of their inclusion in the concealed list of persons. The method may also include generating the concealed list of persons and determining that a potential participant from the user's concealed list of persons has selected the user in a corresponding concealed list of persons that belongs to the potential participant and, in response to the determination, the method may include creating a private conversation instance that is unique to the user and the potential participant. The generated private conversation instance may include an interaction interface that allows the user and the potential participant to interact in a confidential manner. Various other methods, systems, and computer-readable media are also disclosed.

20 Claims, 16 Drawing Sheets

(56) References Cited

U.S. PATENT DOCUMENTS

| | | |
|---|---|---|
| D752,056 S | 5/2016 | Choi |
| D759,723 S | 6/2016 | Butcher et al. |
| D761,303 S | 6/2016 | Nelson et al. |
| D760,773 S | 7/2016 | Cho et al. |
| D753,685 S | 8/2016 | Zimmerman et al. |
| D762,678 S | 8/2016 | Oh et al. |
| D765,099 S | 8/2016 | Kim et al. |
| D765,100 S | 8/2016 | Kim et al. |
| D765,710 S | 9/2016 | Anzures et al. |
| D767,585 S | 9/2016 | Qu |
| D770,475 S | 11/2016 | Choi et al. |
| D770,513 S | 11/2016 | Choi et al. |
| D771,667 S | 11/2016 | Woo |
| D774,078 S | 12/2016 | Kisselev et al. |
| D777,733 S | 1/2017 | Loosli et al. |
| D779,533 S | 2/2017 | Liu |
| D779,556 S | 2/2017 | Yuk |
| D781,890 S | 3/2017 | Gathman et al. |
| D790,570 S | 6/2017 | Butcher et al. |
| D792,445 S | 7/2017 | Sun |
| D794,649 S | 8/2017 | Niijima et al. |
| D794,650 S | 8/2017 | Lee et al. |
| D795,893 S | 8/2017 | Kim et al. |
| D797,131 S | 9/2017 | Mizono et al. |
| D804,504 S | 12/2017 | Hoffman et al. |
| D805,541 S | 12/2017 | Juliano |
| D807,899 S | 1/2018 | Hilhorst et al. |
| D810,124 S | 2/2018 | Wilberding et al. |
| D812,623 S | 3/2018 | Asai et al. |
| D815,128 S | 4/2018 | Phillips et al. |
| D816,692 S | 5/2018 | Folse et al. |
| D819,072 S | 5/2018 | Clediere |
| D820,301 S | 6/2018 | Choi et al. |
| D831,673 S | 10/2018 | O'Rourke et al. |
| D833,466 S | 11/2018 | Knoop |
| D837,238 S | 1/2019 | Spector |
| D841,674 S | 2/2019 | Lee et al. |
| D845,967 S | 4/2019 | Clediere et al. |
| D845,977 S | 4/2019 | Mok et al. |
| D847,181 S | 4/2019 | Hurst et al. |
| D849,768 S | 5/2019 | Tsuji et al. |
| D851,115 S | 6/2019 | Yun |
| D854,038 S | 7/2019 | Kirsanov et al. |
| D854,550 S | 7/2019 | O'Rourke et al. |
| D855,063 S | 7/2019 | Earle |
| D857,049 S | 8/2019 | Lee et al. |
| D858,552 S | 9/2019 | Westerhold et al. |
| D859,444 S | 9/2019 | Clediere et al. |
| D861,024 S | 9/2019 | Clediere et al. |
| D863,333 S | 10/2019 | Westerhold et al. |
| D864,990 S | 10/2019 | Lee et al. |
| 10,440,073 B2 | 10/2019 | Kristiansen et al. |
| D865,785 S | 11/2019 | Westerhold et al. |
| D866,570 S | 11/2019 | Burroughs et al. |
| D870,140 S | 12/2019 | Kane et al. |
| D870,141 S | 12/2019 | Bowden et al. |
| D872,110 S | 1/2020 | Clediere et al. |
| D875,113 S | 2/2020 | Clediere |
| D875,115 S | 2/2020 | Yan |
| D875,123 S | 2/2020 | Ji et al. |
| D875,136 S | 2/2020 | Naimark et al. |
| D878,404 S | 3/2020 | Schwer et al. |
| D878,410 S | 3/2020 | Eu et al. |
| D879,818 S | 3/2020 | Evans et al. |
| D880,498 S | 4/2020 | Shahidi et al. |
| D881,212 S | 4/2020 | McKibbon, III |
| D882,594 S | 4/2020 | Yan |
| D882,608 S | 4/2020 | Murphy et al. |
| D882,610 S | 4/2020 | Reid et al. |
| D882,612 S | 4/2020 | Antillon et al. |
| D879,807 S | 5/2020 | Clediere |
| D883,996 S | 5/2020 | Cotton et al. |
| D884,733 S | 5/2020 | Cornell |
| D886,135 S | 6/2020 | Cheng et al. |
| D886,138 S | 6/2020 | Nesladek et al. |
| D887,435 S | 6/2020 | Lee et al. |
| D888,089 S | 6/2020 | Chaudhri et al. |
| D890,191 S | 7/2020 | Rubin et al. |
| D890,193 S | 7/2020 | Xu et al. |
| D892,140 S | 8/2020 | Clediere et al. |
| D892,838 S | 8/2020 | Hansen et al. |
| D893,528 S | 8/2020 | Wang et al. |
| D894,918 S | 9/2020 | Hopper et al. |
| D896,243 S | 9/2020 | Pitta et al. |
| D896,831 S | 9/2020 | Honnette et al. |
| D896,832 S | 9/2020 | Honnette et al. |
| D914,031 S | 3/2021 | Ding et al. |
| 2013/0205408 A1* | 8/2013 | Yerli .................. G06F 21/6254 726/28 |
| 2014/0115053 A1* | 4/2014 | Iosilevsky .............. G06Q 50/01 709/204 |
| 2016/0112364 A1* | 4/2016 | Gelyana ................ H04L 51/046 709/206 |
| 2020/0344214 A1 | 10/2020 | Ding et al. |

OTHER PUBLICATIONS

Notice of Allowance received for U.S. Appl. No. 29/689,398 dated Dec. 30, 2020, 11 pages.

Notice of Allowance received for U.S. Appl. No. 16/398,141 dated Apr. 21, 2021, 51 pages.

* cited by examiner

ESTABLISHING CONCEALED COMMUNICATIONS BETWEEN PARTIES

CROSS-REFERENCE TO RELATED APPLICATIONS

This application claims priority to and the benefit of U.S. patent application Ser. No. 16/398,141, filed on Apr. 29, 2019, which application is incorporated by reference herein in its entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
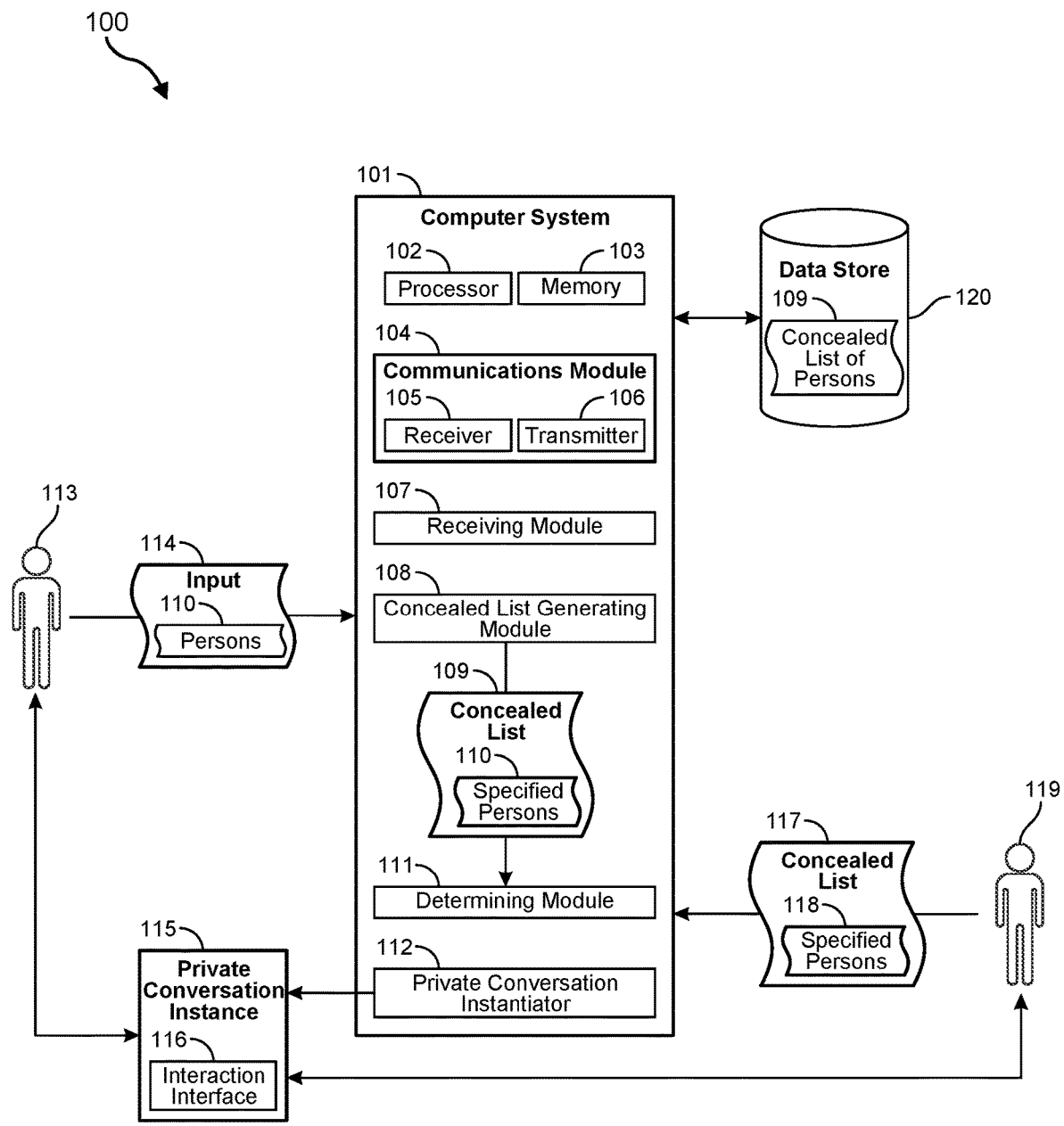
FIG. 1 illustrates a computing environment in which concealed interaction between parties may be facilitated.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to facilitating concealed interaction between parties. As will be explained in greater detail below, embodiments of the present disclosure may allow a user to find other persons that may be interested in participating in a concealed interaction. The concealed interaction may be any type of communication that is only available to those persons. The concealed interaction may be encrypted, protected by gating credentials, or otherwise removed from the general public. The user may identify such persons who would want to interact in such a manner by listing those persons in a concealed persons list. If one or more of the persons identified in the user's concealed persons list, in turn, select that user, the two may converse in a concealed interaction. In some cases, the persons may be identified from individuals within a social media user's friends and, in some cases, the identified persons may be people that the user is potentially interested romantically.

The following will provide, with reference to FIGS. 1-13, detailed descriptions of methods, systems, and user interfaces for facilitating concealed communication with another user. FIG. 1, for example, illustrates a computing environment 100 that includes a computer system 101. The computer system 101 may be substantially any type of computer system including a local computer system or a distributed (e.g., cloud) computer system. The computer system 101 may include at least one processor 102 and at least some system memory 103. The computer system 101 may include program modules for performing a variety of different functions. The program modules may be hardware-based, software-based, or may include a combination of hardware and software. Each program module may use computing hardware and/or software to perform specified functions, including those described herein below.

For example, the communications module 104 may be configured to communicate with other computer systems. The communications module 104 may include any wired or wireless communication means that can receive and/or transmit data to or from other computer systems. These communication means may include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may be configured to interact with databases, mobile computing devices (such as mobile phones or tablets), embedded or other types of computing systems.

The computer system 101 may further include a receiving module 107 that is configured to receive inputs from various users. For example, the receiving module 107 may receive an input 114 from user 113. The input 114 may identify one or more specified persons 110 with whom the user 113 may wish to have a concealed interaction. In some embodiments, the persons 110 specified in the user's input 114 may be persons for whom the user has affection or persons on whom the user 113 has a "crush." These persons 110 may be unaware of the user's feelings toward them and, as such, the user 113 may wish to have a means of finding out whether the specified persons 110 have reciprocal feelings toward the user 113. Traditional systems may have excluded social media friends and family to avoid potential mishaps with users expressing crushes on close friends or family members. The systems described herein, however, may be open to a user's close friends, as those friends may not be aware of and may not be notified of the user's feelings toward them. When using the embodiments described herein, a user may select certain persons 110 and add those persons to a concealed list of persons 109. Only if the persons specified in that list also add the user 113 to their own concealed list 117 will the user 113 and the specified person 119 be made aware of their mutual interest in each other.

The concealed list generating module 108 of computer system 101 may access the input 114 received by the receiving module 107 and may use the information in the input to create a concealed list of persons 109. The concealed list 109 may include some or all of the persons 110 identified by the user 113. In some cases, as will be explained further below, the user 113 may be limited in how many persons the user can add to the concealed list 109. For example, the user 113 may be limited to adding one person per day, or one person per week, or may only add a person to the concealed list 109 if the user removes at least one previously selected person, etc. These limits may be specified in a policy governing the user 113.

The determining module 111 of computer system 101 may determine whether the concealed list of persons 109 created for the user 113 includes any persons (e.g., 119) that selected the user 113 as a person in whom they had interest or on whom they had a crush. For example, the user 119 may create their own concealed list of persons 117 with their own persons 118 with whom they may wish to have a concealed interaction. The determining module 111 may determine, for instance, that user 119 selected user 113 and that user 113 selected user 119. When such a match occurs, the private conversation instantiator 112 may generate a private conversation instance 115. The private conversation instance 115 may include an interaction interface 116 that allows the user 113 and the user 119 to converse in a private manner. The conversation may include text, audio, video, games, virtual/augmented reality, or other means of interacting. In at least some embodiments, this private conversation interface 115 may be generated automatically upon determining that the two users have each selected each other in their concealed lists. The two may then use the private conversation interface 115 to interact until the instance expires or is terminated by one of the users. These concepts will be explained further below with regard to method 200 of FIG. 2 and with further regard to the example user interfaces of FIGS. 3-13.

Figure 2:
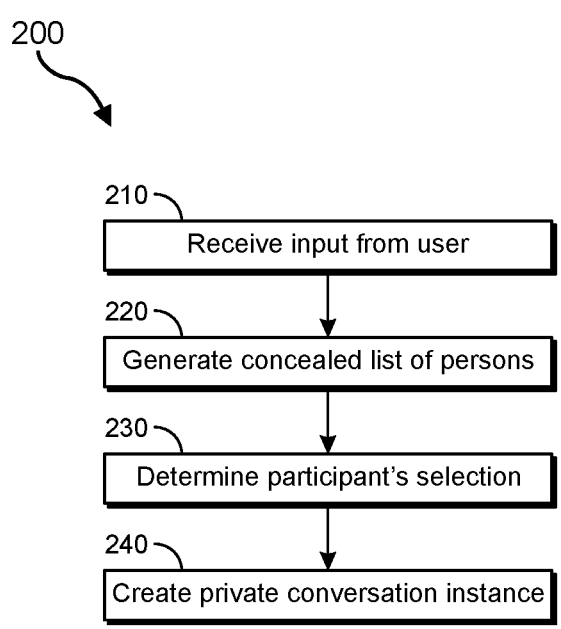
FIG. 2 illustrates a flow diagram of an exemplary method for facilitating concealed interaction between parties.

FIG. 2 is a flow diagram of an exemplary computer-implemented method 200 for facilitating concealed interaction between parties. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, one or more of the systems described herein may facilitate concealed interaction between parties using method 200. Method 200 may include, for example, receiving, at the receiving module 107 of FIG. 1, an input 114 from a user 113 identifying specified persons 110 that are to be included in a concealed list of persons 109. In at least some embodiments, the specified persons 110 may be unaware of their inclusion in the concealed list of persons 109. The user 113 may select multiple different persons 110 to be included in their concealed list of persons 109 including individuals from among the user's social media friends. The user 113 may be able to search through friends and contacts to whom the user has connected on social media. The user 113 may then add those friends or contacts to the concealed list of persons 110. In some cases, the user 113 may be limited to a total number of friends that can be added to the concealed persons list 109. This number may be, for example, five, 10, 15, 20, 25, or some other number of persons. In some cases, this number may vary based on how long the user has been a member of the social media platform.

The method 200 of FIG. 2 may also include generating the concealed list of persons which includes those specified persons identified in the input received from the user at step 220. The concealed list generating module 108 may generate a concealed list of persons 109 for the user 113 based on the persons 110 identified in the input 114. Other persons may be added or removed from the list 109 based on subsequent inputs from the user 113. Thus, the concealed list of persons 109 may continually expand or contract based on the user's current crushes or attractive feelings towards other people. Many times, the user 113 may not wish for the specified persons 110 to know about the user's feelings towards them unless the feeling is mutual. Thus, in this manner, other users (within the same social media platform or, perhaps, within different social media platforms) may create their own concealed list of persons (e.g., list 117 created by user 119).

The determining module 111 may then determine when matches exist between users. For instance, the method 200 may include determining, at step 230, that a potential participant 119 from the user's concealed list of persons 109 has selected the user 113 in a corresponding concealed list of persons 117 that belongs to the potential participant 119. Then, in response to the determination, the private conversation instantiator 112 may create, at step 240, a private conversation instance 115 that is unique to the user 113 and the potential participant 119. The generated private conversation instance 115 may include an interaction interface 116 that allows the user and the potential participant to interact in a confidential manner. Many other variations and intermediate or precursor steps may be implemented with respect to method 200. These embodiments and variations will now be discussed with regard to FIGS. 3-13 below.

Figure 3:
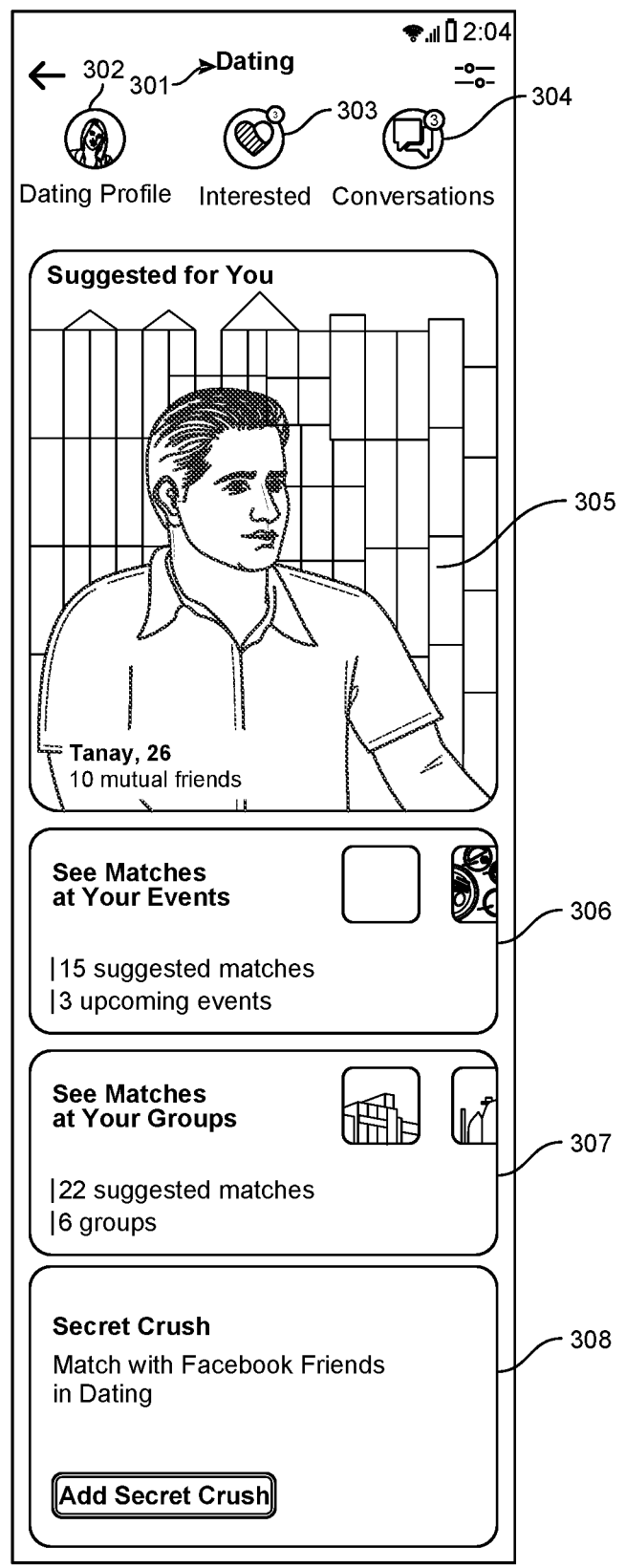
FIG. 3. Illustrates an embodiment of a user interface in which a user may initiate a concealed interaction with another party.
Figure 4:
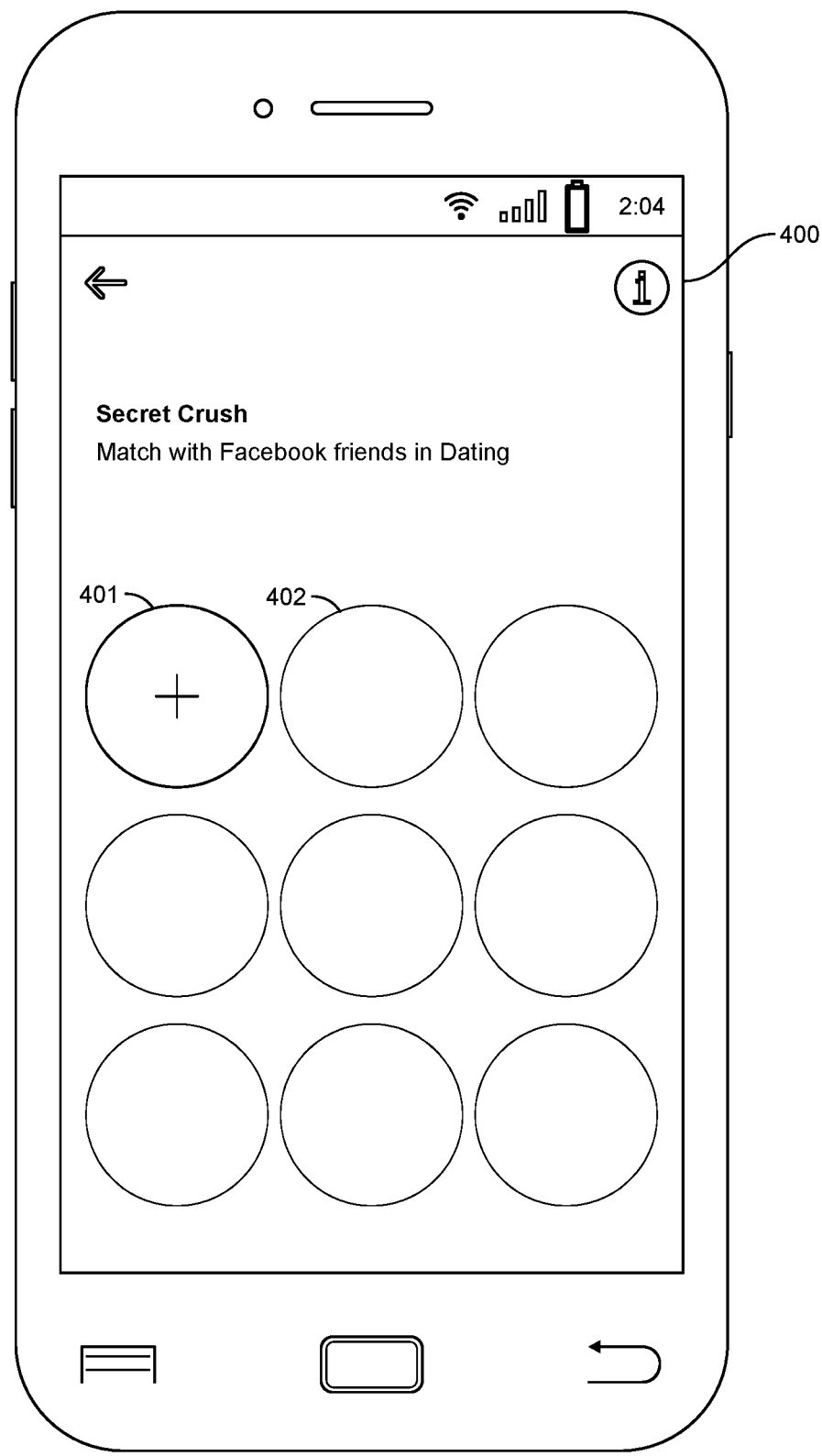
FIG. 4 Illustrates an alternative embodiment of a user interface in which a user may initiate a concealed interaction with another party.

FIG. 3 illustrates an embodiment of a user interface 301 that may allow access to dating or other social media features. The user interface 301 may, for example, provide access to a user's dating profile 302. The dating profile 302 may list the user's dating preferences, the user's interests, pictures associated with the user, and other information. The user interface 301 may also include interactive user interface elements such as element 303 that may allow the user to indicate in whom the user is interested. User interface element 304 may allow the user to access conversation instances created between the user and other people the user is interested in.

For example, as noted above, the user 113 may provide an input 114 identifying one or more persons 110 in whom the user is interested. One of these persons 110 may be user 119. Thus, user 113's concealed list of persons 109 may include user 119. User 119 may also create a concealed list of persons 117 (perhaps using interactive user interface element 303 of FIG. 3). User 113 may be one of the specified persons 118 identified in user 119's concealed list of persons 117. The private conversation instance 115 created by computer system 101 may be accessed using interactive user interface element 304. User interface element 304 may also be used to access other private conversation instances 115 created between the user 113 and other persons identified using element 303. In some embodiments, the user interface 301 may provide suggested matches including a suggested match image 305 as well as an indication of their name, age, and how you might know that person (e.g., multiple mutual friends).

The user interface 301 may be designed and implemented in many different forms. For example, user 113 of FIG. 1 may select interactive user interface element 303 and may be taken to a user interface similar to that shown in FIG. 4. Alternatively, the user may select an entry point such as 308 which is provided among other posts in the user's feed including posts 306 and 307. Regardless of which entry method is used, the user 113 may be presented with user interface 400 of FIG. 4. This interface 400 may include, for example, user interface elements that allow a user to add one or more persons with whom they wish to have a concealed interaction. This concealed interaction may include a text conversation, an audio conversation, a video conversation, an ephemeral interaction that is scheduled to automatically expired after a set period of time, or simply an indication that the user 113 has an interest in or a crush on that person. Thus, using user interface element 401, the user may add one or more users on whom the user has a crush, or on with whom the user wants to interact in a concealed manner. The user interface 400 may also illustrate one or more indicators (e.g., circles 402) that may be later filled in with pictures of persons with whom the user wishes to carry out a concealed communication.

Figure 5:
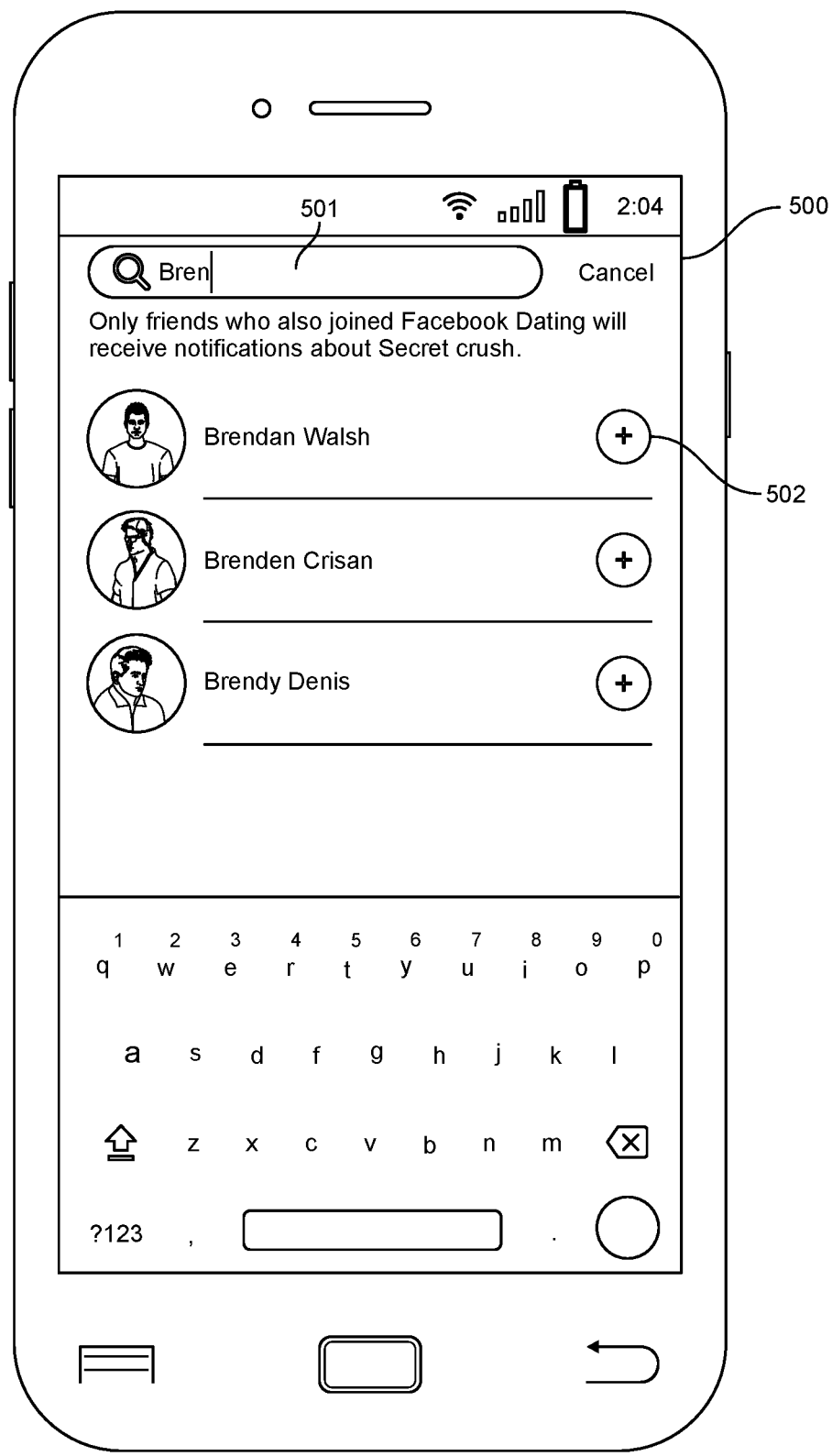
FIG. 5 Illustrates an embodiment of a user interface in which a user may identify another party with whom the user may have a concealed interaction.
Figure 6:
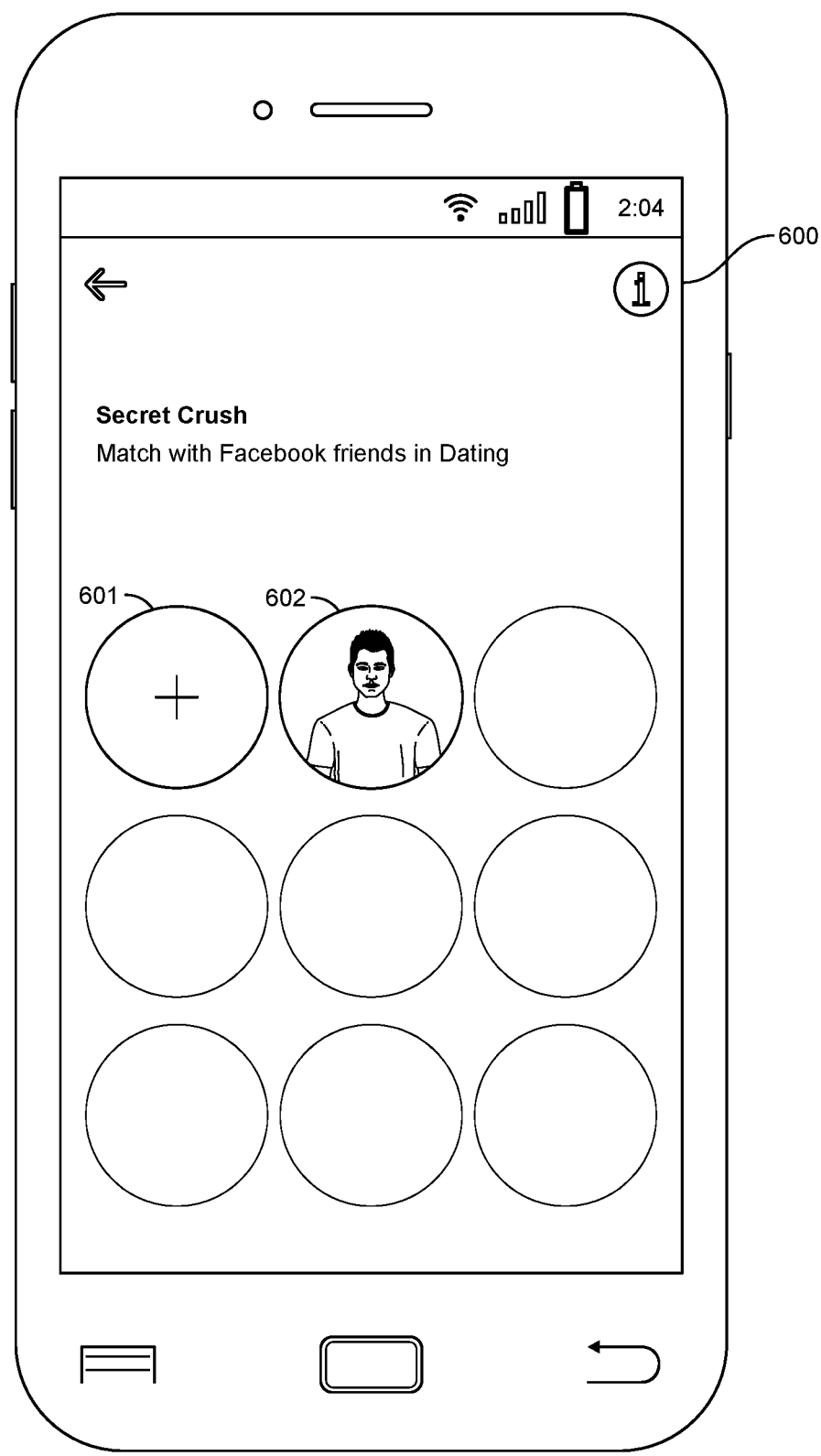
FIG. 6 illustrates an embodiment of a user interface in which a user may interact with another party in a concealed manner.
Figure 7:
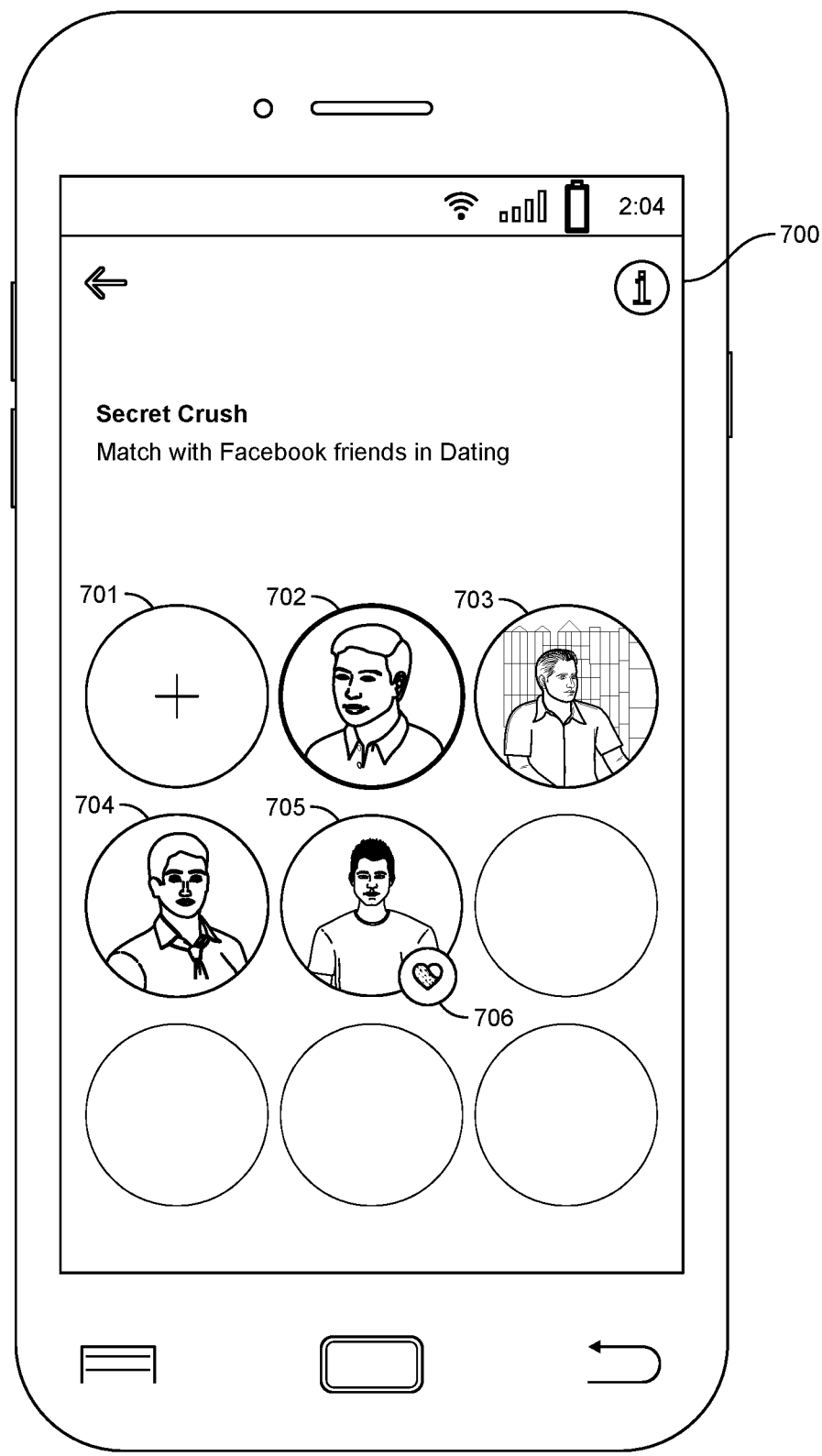
FIG. 7 illustrates an embodiment of a user interface in which a user may interact with another party in a concealed manner.

Upon selecting user interface element 401, the user interface 400 may transition to a user interface similar to or the same as that shown in FIG. 5. The user interface 500 of FIG. 5 may provide a list of friends of user 113. This list of friends may include users that have accepted the user 113 as a friend within the social networking platform. In many cases, friends may be excluded from dating applications or other social media applications that allow persons to express romantic interest in each other. In the embodiments described herein, users may be able to select their friends by selecting a user interface element 502 that may add that friend to the user's concealed list of persons 109. In some embodiments, other people, not necessarily friends of the user 113, may be added by selecting similar user interface elements. These people may be suggested based on matching elements within their personal profile or based on other metadata or prior actions associated with the person.

FIG. 5 further illustrates an embodiment of the user interface 500 in which the user (e.g., 113 of FIG. 1) has selected a user named "Brendan Walsh" using user interface element 502. The user interface 500 may provide an indication of the user's name and perhaps other features related to the user. The user interface 500 may indicate that the potential participant (Brendan) will only know about the user's crush on him if he also identifies user 113 as a person on whom he has a crush. User 113 may be able to write a message in box 501 that the identified user (Brendan Walsh) may read if he also selects the user 113 as a person in whom he has a romantic interest. Thus, the user may be able to write a message that is only visible to Brendan if he provides a reciprocal indication of interest. If the user decides not to add Brendan to their concealed persons list 109, the user 113 may close the user interface.

If the user does select Brendan as a person in whom the user 113 is interested, a user interface 600 may be presented. The user interface 600 may provide a user element 601 that allows the user to add friends to a secret crush list. User interface element 602 may illustrate a picture of a user (e.g., Brendan) that is on the secret crush list. Clicking on the user interface element 602 may provide various details about Brendan including his name or alias, where he went to school, where he is from, what his interests are, etc. Interactive user interface elements may allow the user 113 to see who Brendan's friends are, see whose feeds he is following, and perform other functions including sending a message to him.

Additionally or alternatively, if the user 113 does select Brendan (or another user) from user interface 500 of FIG. 5, the user may be presented with user interface 700 in which a picture of Brendan is shown (705), along with an indication that he has been added to the user's concealed list of persons (indicated at 706). The user interface 700 may also include a user interface element 701 that allows the user to add additional friends to the user's concealed list of persons including friends 702, 703, and 704. The concealed list of persons may be ranked according to which persons were added most recently. Thus, in FIG. 7, for example, person 702 may have been added to the list before persons 703, 704, and 705, and so on. Other methods of ranking the persons, including using user rankings specifying which persons they like the most, may also be used.

Figure 8:
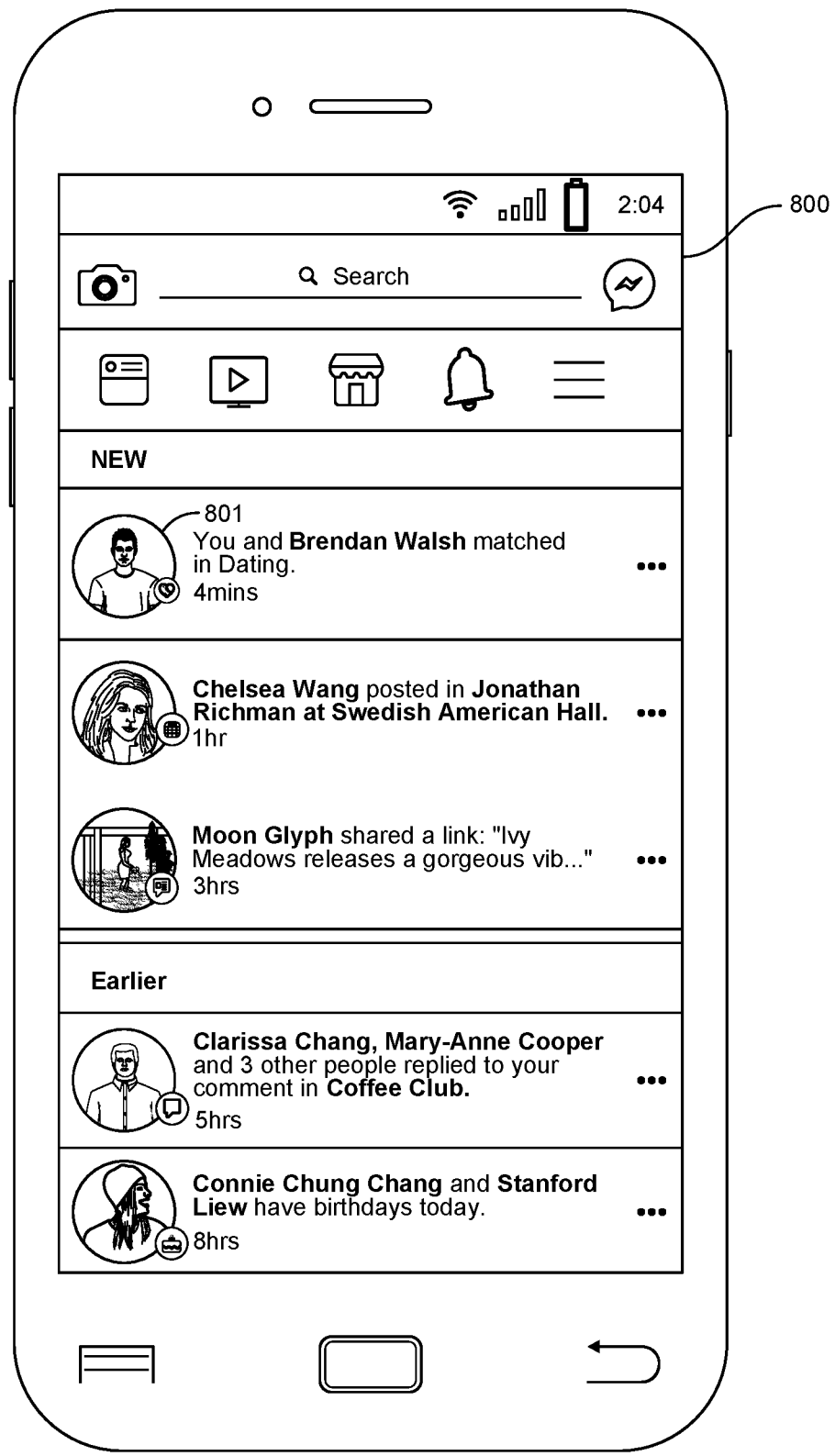
FIG. 8 illustrates an alternative embodiment of a user interface in which a user may interact with another party in a concealed manner.

User interface 800 of FIG. 8 illustrates an example user interface in which the user (Brendan in this example) has also selected the user 113 as a person in whom he has interest. The icon 801 may be dynamically added to the user's picture to indicate that that user has mutually added the initial user 113 to his concealed list of persons.

Figure 9:
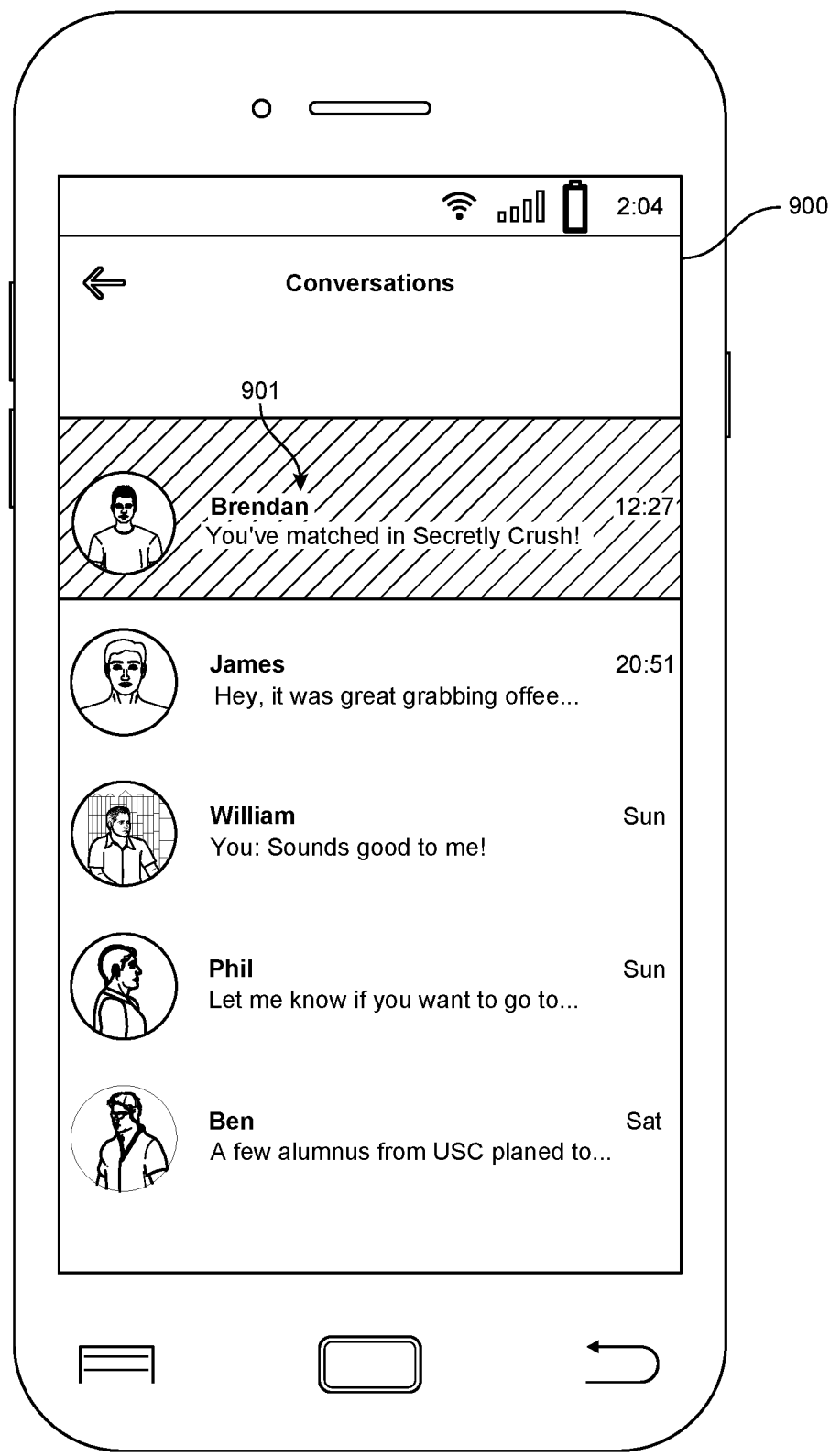
FIG. 9 illustrates an embodiment of a user interface in which a user is notified of another user's intent to have a concealed interaction.

For example, in user interface 900 of FIG. 9, a notification 901 may indicate via written description that Brendan Walsh is interested in the user 113. In some embodiments, the computer system 101 of FIG. 1 may generate and send (e.g. via communications module 104) a notification to user 113 indicating that a person that the user 113 selected in their concealed list of persons 109 has indicated a mutual interest. In some embodiments, when the user 113 has identified multiple different people in their concealed list of persons 109, the notification 109 may withhold the identity of the user that indicated a reciprocal interest in the user. This information may be withheld for a specified amount of time, potentially to get the user 113 excited that someone has expressed mutual interest, but the user does not know who. In some cases, various conditions may be placed (e.g., fun, get-to-know-you questions that the user needs to answer) and the user 113 may need to meet those conditions (e.g., by answering the questions) before the other person's identity is revealed. In other cases, the notification may simply reveal the identity of the participant that indicated the mutual interest in the user 113 (such as with notification 901).

In some embodiments, the computer system 101 may generate notifications to the user 113 indicating that at least one of the user's friends has added them to their concealed list of persons. This may help to pique the user's interest in who might have added the user 113 to their concealed list of persons. The notifications may be provided within a dating-specific application or portion of a messaging application, or the notifications may be provided alongside other messages from friends in a social media messaging application. In some cases, the computer system 101 may generate a notification for the user 113 indicating one of the persons 110 in the user's concealed list of persons 109 has at least considered adding the user to their own concealed list of persons.

For instance, if a person 110 identified by the user 113 has selected the user 113 and is viewing the user's profile, but has not saved or otherwise committed to adding the user to the concealed list of persons 117, the user 113 may be notified of such activity which, again, may pique the user's interest in who might have a secret interest in them. If that person 119 does end up saving the user 113 in their concealed list of persons 117 after initially browsing the user's profile details, the computer system 101 may notify the user that the person 119 has selected the user 113 in the person's concealed list of persons. In other cases, users may browse other friends' dating profiles and no notifications may be generated. Thus, if the user 113 has a friend (e.g., user 119) that never opts in to a dating portion of a social media messaging application or opts in to the dating portion but does not add the user 113 to their concealed list of persons, the person 119 may not ever become aware that the user 113 has added them to such a list.

In some embodiments, persons 110 specified by the user 113 that are included in the user's concealed list of persons 109 may be selected from among persons that are social media friends with the user. This may be true even within a social media platform that normally excludes friends from people you can take a romantic interest in. While the user's concealed list of persons 109 may be open to friends and other types of users including users of other social media platforms and users that are not members of any social media platform, the user's concealed list of persons may be limited to a specified number of persons (e.g., 10 persons). This may prohibit the user 113 from simply identifying everyone in their list of friends and may constrain the user to choose only those persons in whom the user is truly interested.

In some embodiments, the user 113 may be limited to adding only a specified maximum number of persons to the user's concealed list of persons within a specified timeframe. For example, the user may be limited to adding one extra person per day (or other time period) or may be limited to a total number of persons in the user's concealed list of persons 109. In such cases, the user may be able to remove persons from their concealed persons list at any time. In some cases, a potential participant (e.g., 119) may opt in to a specified application feature (e.g., a dating component of an application) before being selectable by the user 113 (or by any other user) as a person in the user's concealed list of persons 109. Thus, the potential participant 119 may not even be a potential participant until they opt in to that feature of the platform. Information indicating whether a potential participant has opted in to this feature (e.g., a dating feature) may be withheld from the user 113. Accordingly, to maintain the privacy of the user's friends, the user may be unaware of whether those users have opted-in to a dating feature and may be further unaware of whether the potential participant has added the user as on their concealed persons list until the user 113 conveys a mutual interest.

In some embodiments, access to the user's concealed list of persons 109 may be initially provided in one manner and may transition over time to another manner. For instance, access to the user's concealed list of persons 109 may initially be provided by long-pressing a certain button (e.g., a disguised indicator that also acts as a button such as element 301 of FIG. 3). At some future point in time, the user interface may be updated to include a more easily accessible option (e.g., simple button press) to access the concealed list of persons 109 or the dating features generally.

Figure 10:
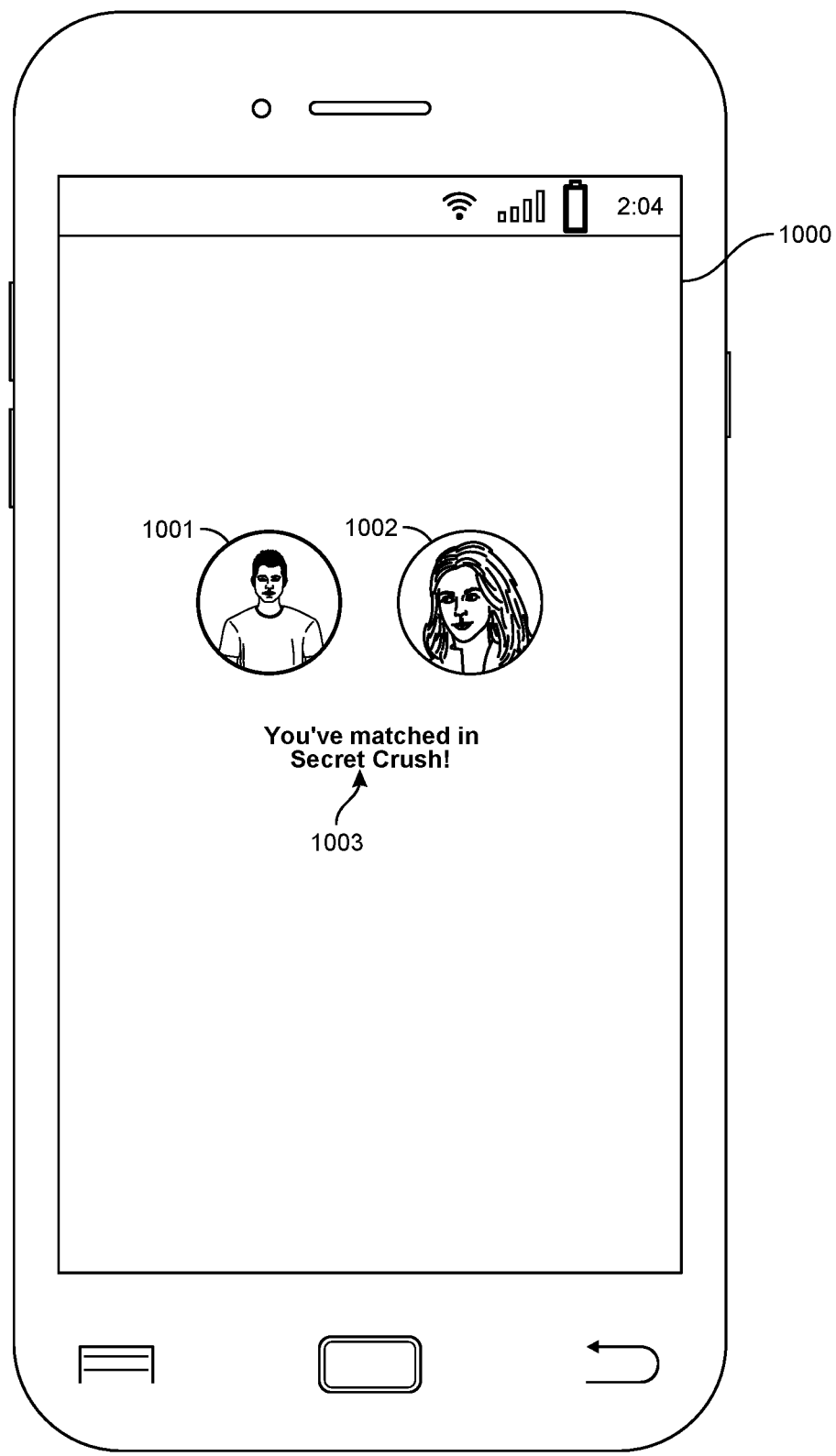
FIG. 10 illustrates an alternative embodiment of a user interface in which a user is notified of another user's intent to have a concealed interaction.

When two (or potentially more) users indicate mutual interest in each other, an interface such as 1000 of FIG. 10 may indicate that two users have selected each other on their corresponding concealed lists of persons. User interface element 1003 may, for example, indicate that Brendan Walsh (1001) and user 113 (1002) have both indicated a romantic interest in each other. Once such a mutual interest has been indicated, the computer system 101 of FIG. 1 may generate a private conversation instance 115. The private conversation instance 115 may include an interaction interface 116 that allows the two users to interact. In some cases, for example, the private conversation instance 115 may include a text-based chat interface, an audio-based chat interface, or a video-based chat interface. For instance, as shown user interface 1100 of FIG. 11A, a private conversation instance may include an interactive button that allows the users to initiate a private chat. The user interface 1100 may also include user interface elements 1101, 1102, 1103, that allow the user 113 to add other friends to their secret crush list or show those friends that have been added to the list. The user interface window 1104 may include text, video, pictures, gifs, or other items that highlight the user's mutual interest in each other.

Figure 11A:
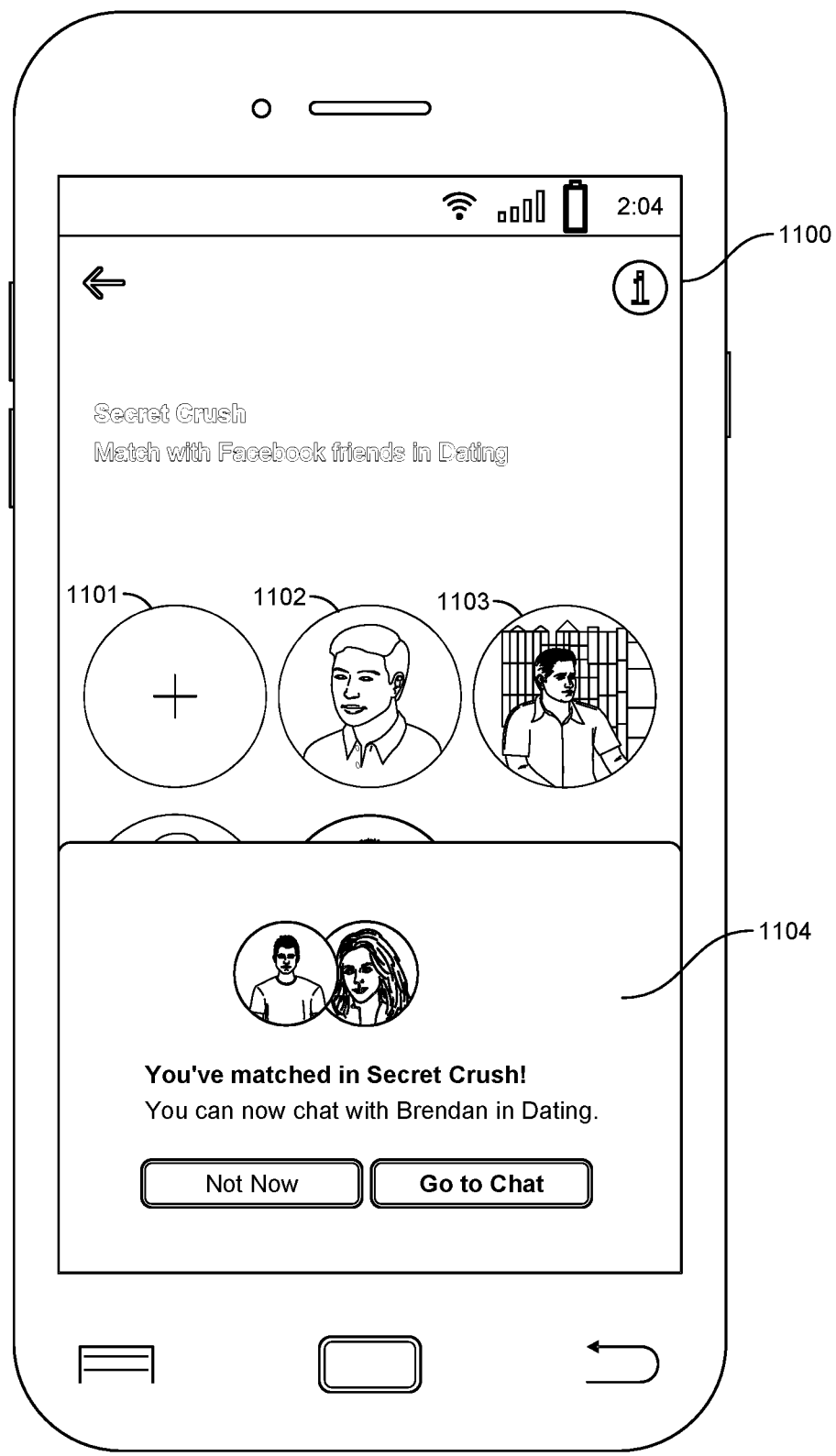
FIGS. 11A-11B illustrate embodiments of a user interface in which a user may have a concealed interaction with another user.
Figure 11B:
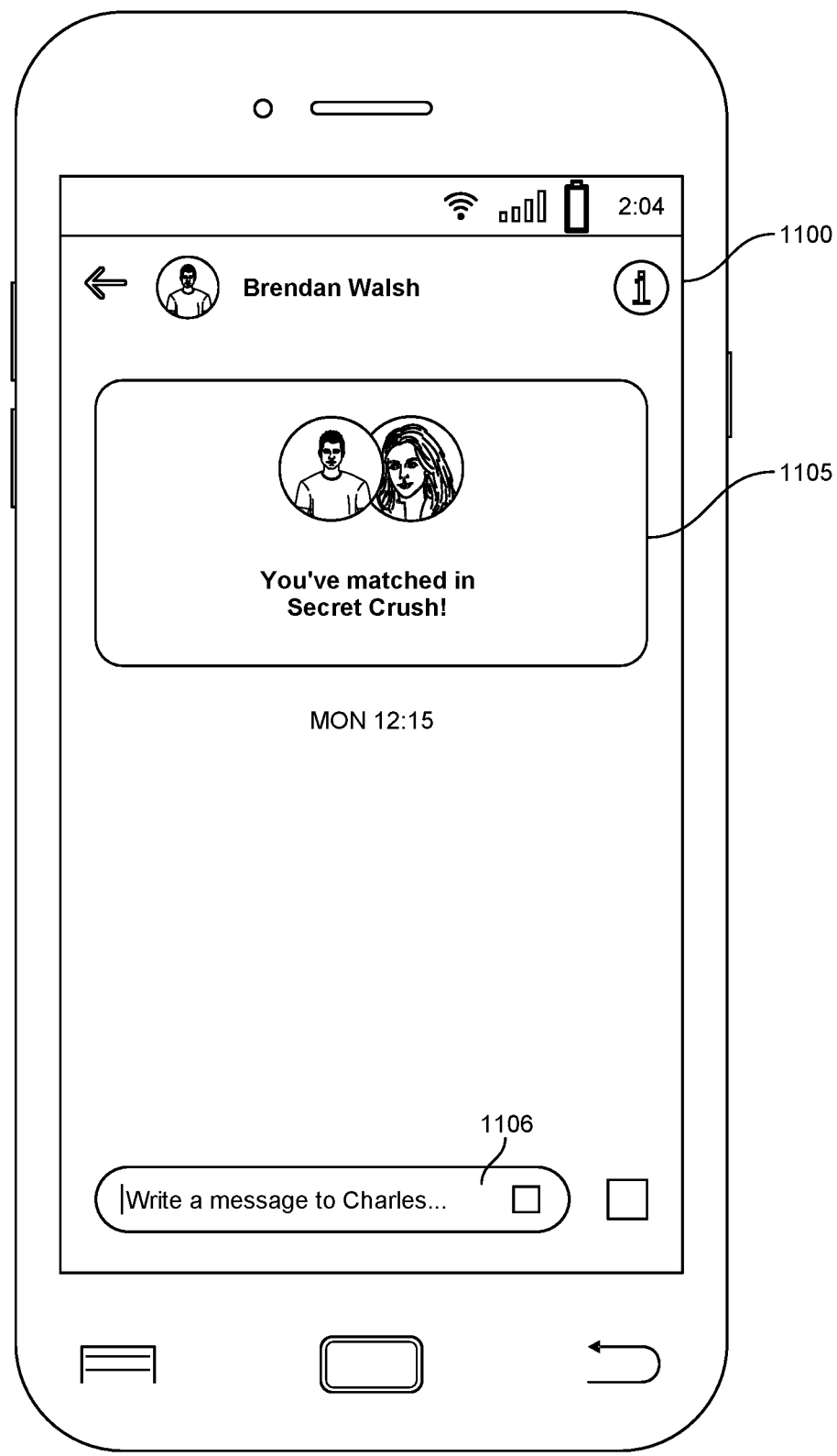

In some embodiments, the interaction interface 116 (or 1105 of FIG. 11B) may be automatically generated when the two users select each other as members of their own concealed list of persons. The interaction interface 1105 may be ephemeral and may be configured to expire after a specified amount of time. The amount of time may be configured in policy and may be based on the type of user, the type of account, or other factors. As shown in FIG. 11B, the interface 1100 may show a joined image indicating that both users have selected each other. If one or both of the users created private notes for the other user, those notes (or videos or audio sound clips) may be presented to the user. Users may type messages to each other using interaction interface 1106. Upon selecting the interaction interface 1106, for example, a chat history may be illustrated within the user interface 1100. This user interface 1100 may accommodate multiple different interaction interfaces at once (e.g., a text-based interface and a video-based interface) and may allow the user to select where each of the interaction interfaces is displayed within the user interface 1100.

In some cases, the private conversation instance 115 may provide access to a user profile associated with the potential participant. For example, when a mutual interest is established, a conversation thread in a dating conversations tab may be automatically created, and the user may be able to see the user's friend's dating profile. The user may then browse the friend's dating profile and get to know that person better. In some embodiments, the interaction interface 116 of the private conversation instance 115 may be created separately from any existing conversation threads between the user and the potential participant. Thus, if the user 113 had been conversing with the potential participant 119 using a traditional social media messaging application, and then began conversing using a private conversation instance 115, the newly-created conversation thread created in the private conversation instance may be kept separate from any existing social media messaging application conversation threads. Thus, each user's privacy and secret admirations may remain a secret from other of the user's friends and from the public at large.

Figure 12A:
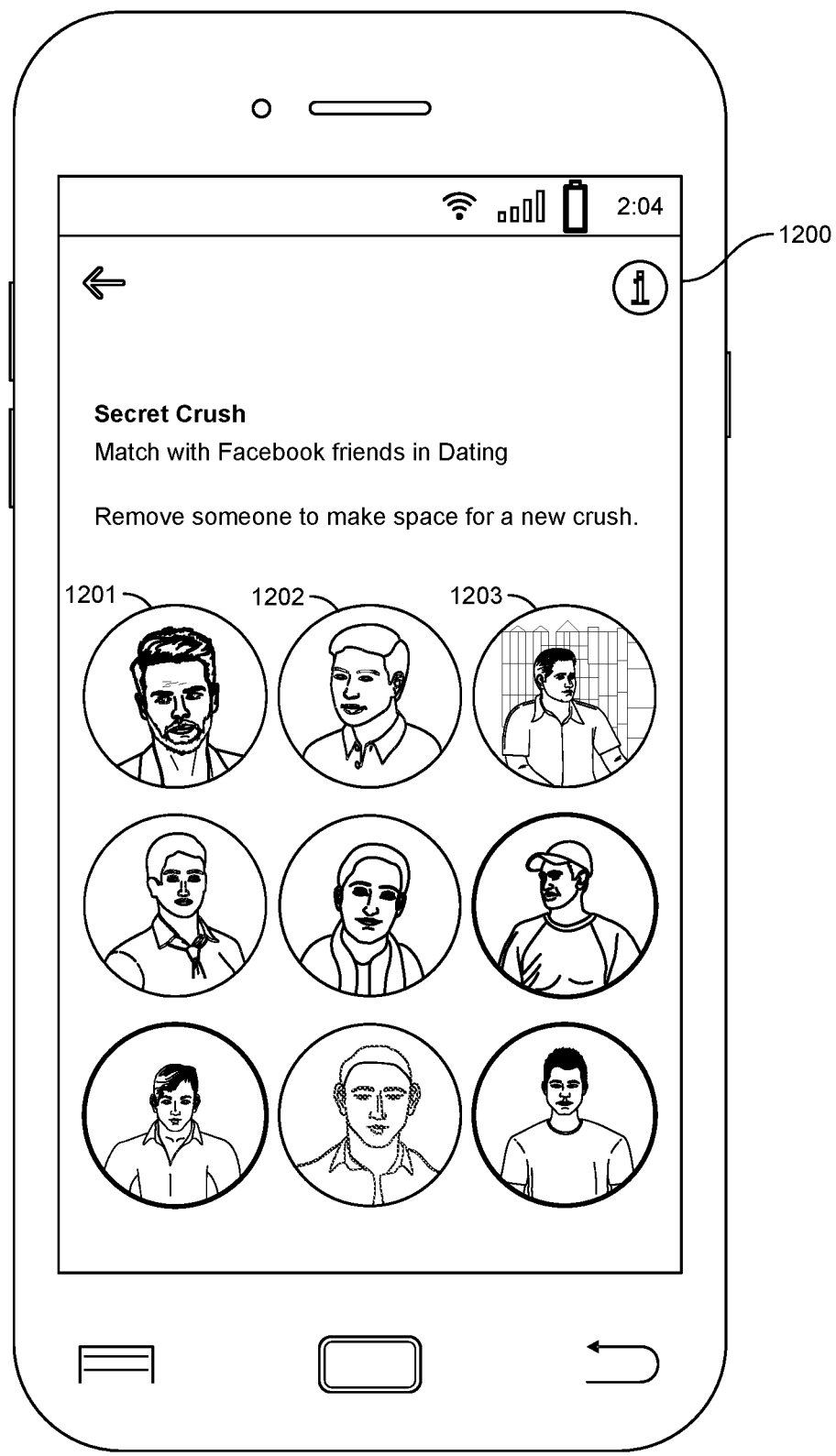
FIGS. 12A-12C illustrate embodiments of a user interface in which a user may have a concealed interaction with another user.
Figure 12B:
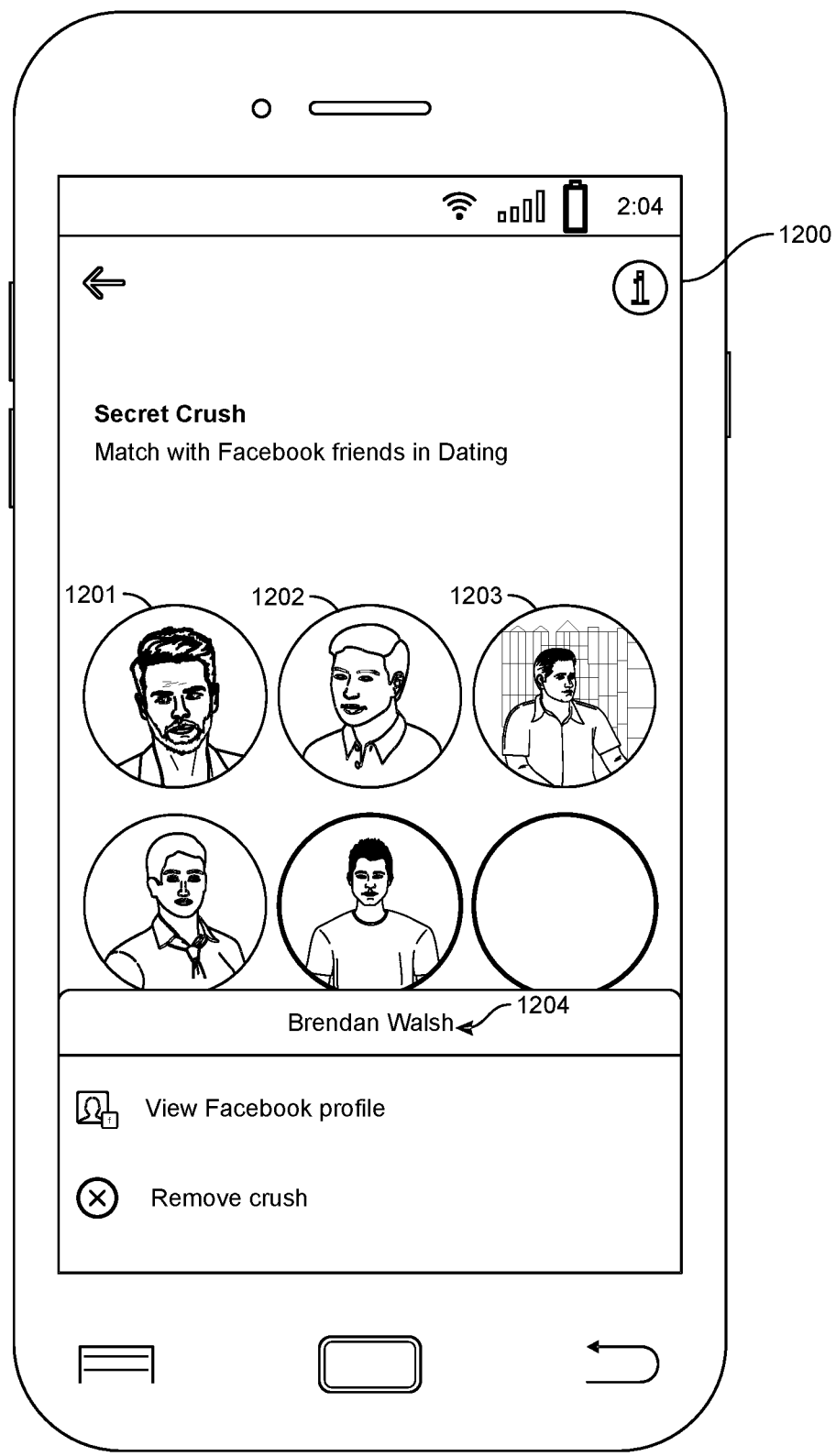
Figure 12C:
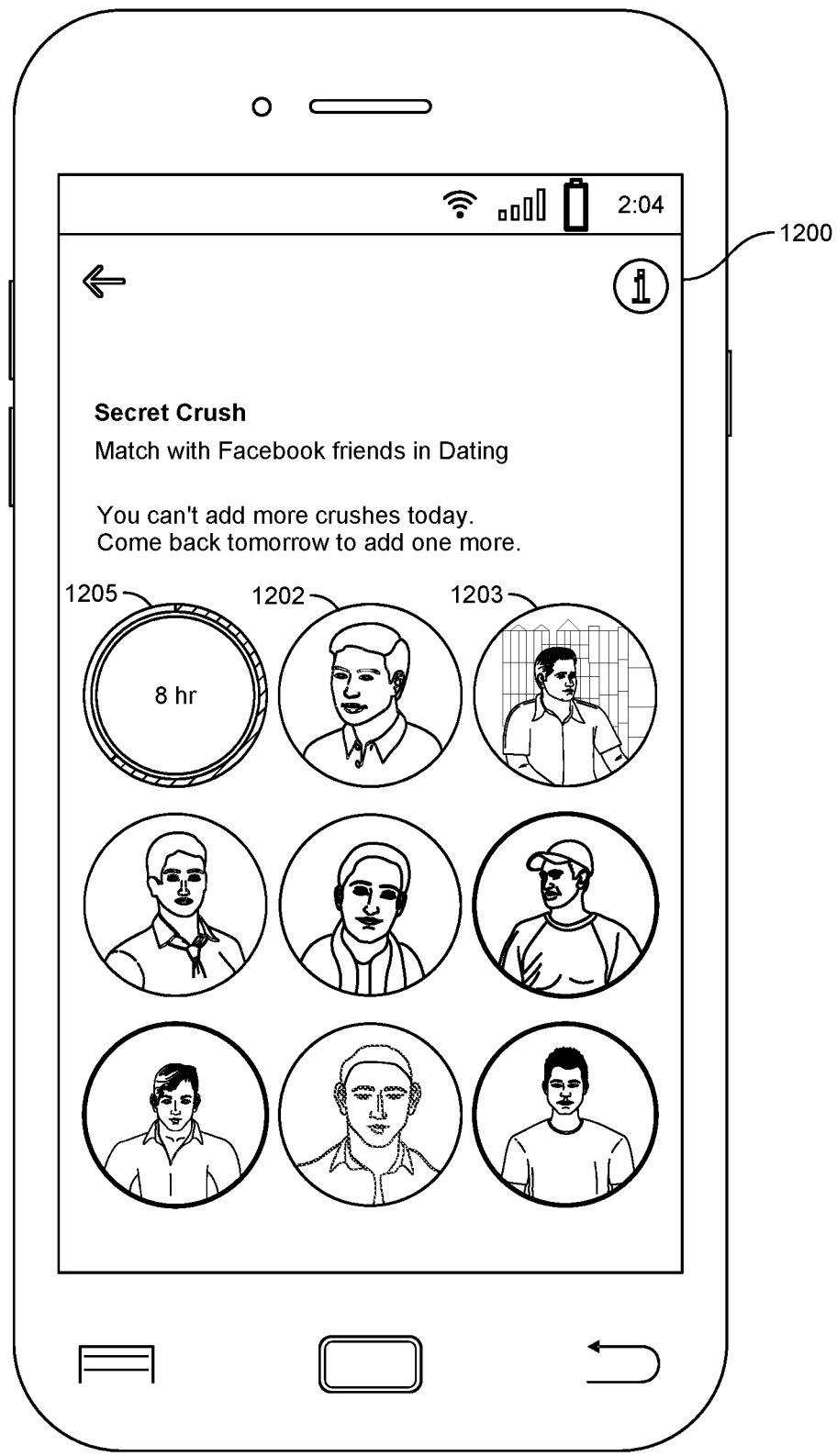

In some embodiments, as shown in FIG. 12A, a user interface 1200 may be provided that allows users to remove persons from their secret crush list. For example, user 113 of FIG. 1 may select one or more of the image icons 1201,

1202, 1203, or other images to remove those persons from the user's secret crush list. If the user selects the one of the images, for example, the user interface 1200 may display a prompt in window 1204 in FIG. 12B asking the user if they intend to remove the user from the list or if they would simply like to view that user's social media profile. If the user confirms the removal, the person is removed from the secret crush list. In some cases, the user 113 may be allowed to remove as many people as they want from their list at any given time but may only be able to add a certain number of people per day or per hour or per week to their secret crush list. In some embodiments, the user interface 1200 of FIG. 12C may display a timer 1205 indicating the amount of time that needs to pass before the user will be able to add a new person to the crush list. In this example, the amount of time is eight hours. Accordingly, at least in some embodiments, a user may be able to quickly clear space to add new crushes but may only be able to add new crushes at a more moderate pace.

In some cases, various removal rules may be applied. For example, if users A and B have both crushed on each other and user A removes user B from the double crush list, user A may not necessarily be removed from user B's double crush list. This option may be configurable by the user or by an administrator. Similarly, if user A deletes a double crush with user B, user A may can still be able to add user B to her crush list again. If such occurs, user B may show up on user A's crush list as a double crush. Still further, removing a double crush may not remove the chat thread shared between users A and B, allowing those users to read through the chat thread at a later time. Likewise, removing a chat thread between two double crushed users may not remove the crush and may, instead, simply remove a record of previous chats between the users. Other rules may also be applied to removals based on policy.

Figure 13:
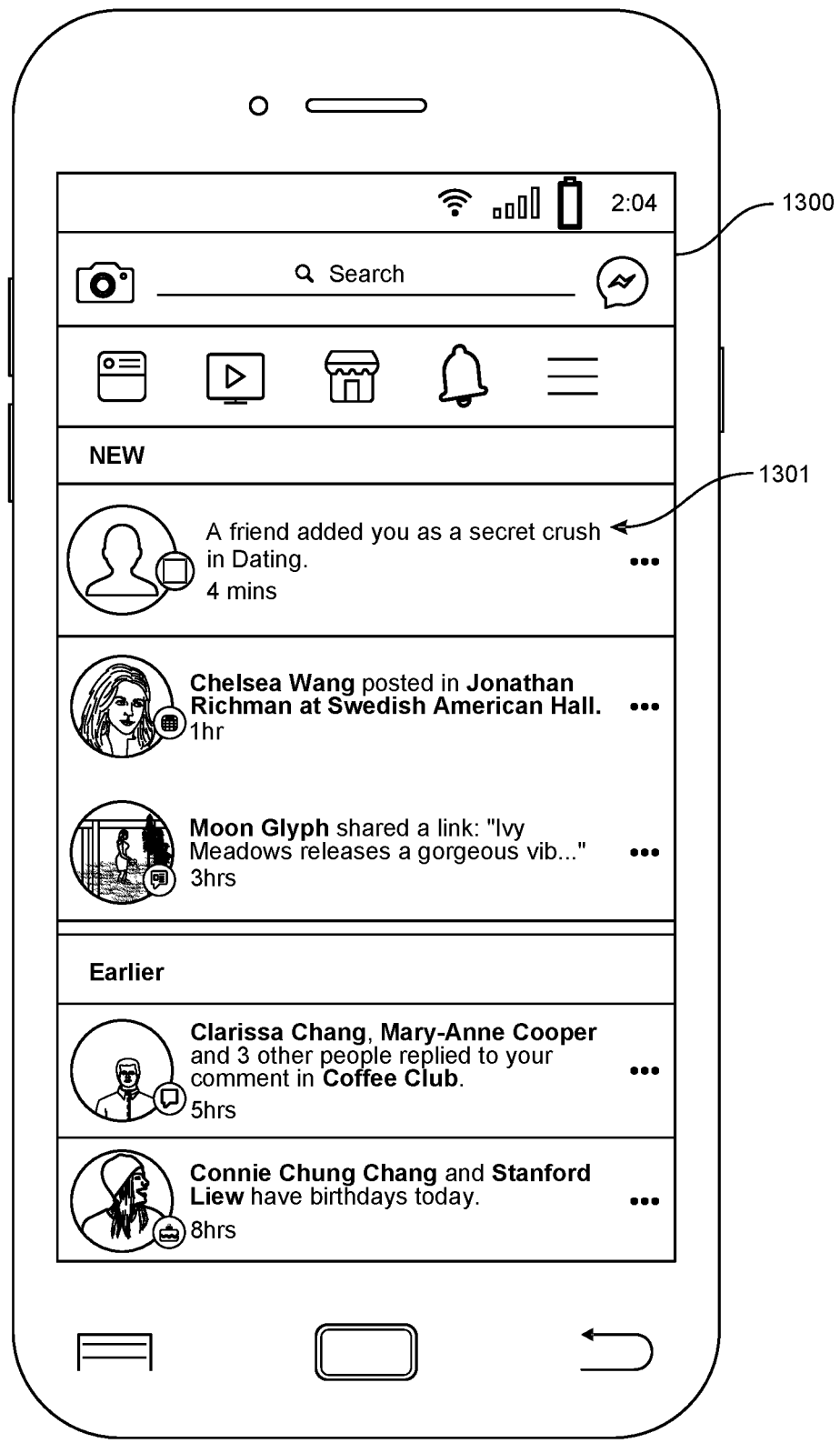
FIG. 13 illustrates an embodiment of an invitation to join a platform that facilitates concealed interactions between users.

In some embodiments, as shown in FIG. 13, a user interface 1300 may notify a user that an anonymous user has added the user to a concealed list of persons. As shown at 1301, for example, a notification may indicate that "A friend" has indicated an interest in the user 113 and that the user can join a dating portion of a social media application to find out who that someone is. Other steps or different steps may also be used by the user to find out who has expressed interest in the user. In some cases, the anonymous user's indication of interest (or user 113's indication of interest, or user 119's indication of mutual interest) identifying who is to be included in the corresponding user's concealed list of persons may expire after a specified period of time. Thus, after the anonymous user or other user has specified various persons to add to the concealed list of persons, those persons may be removed automatically after some period of time. For instance, if the user 113 is made aware of an anonymous crush or lists someone who does not express a mutual interest within a week or a month or some other time period, the indication of interest may expire and those persons may be removed from the anonymous user's or other user's concealed list of persons.

Accordingly, the embodiments described herein may allow a user to express interest in another user in a secret, concealed manner. As such, the person in whom the user is interested may only become aware of that interest if they themselves identify the user as a person they are interested in. This mutual interest may then automatically cause a private conversation instance to be generated that allows the two mutually interested parties to interact with each other in a private manner that is not known to the public. Thus, users may more confidently and more privately determine whether some specified friends share the secret crush another friend may have on them.

In one embodiment, a method may be provided for facilitating concealed interaction between parties. The method may include receiving an input from a user identifying specified persons that are to be included in a concealed list of persons. The specified persons may be unaware of their inclusion in the concealed list of persons. The method may also include generating the concealed list of persons which includes those specified persons identified in the input received from the user. The method may further include determining that a potential participant from the user's concealed list of persons has selected the user in a corresponding concealed list of persons that belongs to the potential participant and, in response to the determination, creating a private conversation instance that is unique to the user and the potential participant. The generated private conversation instance may include an interaction interface that allows the user and the potential participant to interact in a confidential manner.

In some examples, the method may further include notifying the user that the potential participant has selected the user in the potential participant's concealed list of persons without revealing the identity of the potential participant. In some examples, the method may include notifying the user that the potential participant has selected the user in the potential participant's concealed list of persons, where the notification reveals the identity of the potential participant.

In some examples, the user may be notified that the potential participant has selected the user in the potential participant's concealed list of persons before the user saves the potential participant to the user's concealed list of persons. In some examples, the user may be notified that the potential participant has selected the user in the potential participant's concealed list of persons after the user has saved the potential participant to the user's concealed list of persons.

In some examples, the specified persons that are included in the user's concealed list of persons may be selected from among persons that are social media friends with the user. In some examples, the user's concealed list of persons may be limited to a specified number of persons. In some examples, the user may be limited to adding only a specified maximum number of persons to the user's concealed list of persons within a specified timeframe.

In some examples, the potential participants may opt in to a specified application feature before being selectable as a person in the user's concealed list of persons. In some examples, the interaction interface of the private conversation instance may include a text-based chat interface or a video-based chat interface. In some examples, the interaction interface may be automatically generated upon mutual selection by the user and the potential participant.

In some examples, the private conversation instance may be ephemeral and may be configured to expire after a specified amount of time. In some examples, the potential participant may be notified that an anonymous user has added the potential participant to a concealed list of persons.

In some examples, the input from the user identifying specified persons that are to be included in the concealed list of persons may expire after a specified period of time. As such, one or more of the specified persons may be removed from the user's concealed list of persons. In some examples, access to the user's concealed list of persons may be initially provided in a first manner and may transition after a specified time period to a second, different manner.

In some examples, the private conversation instance may provide access to a user profile associated with the potential participant. In some examples, the interaction interface provided in the private conversation instance may be created separately from any existing conversation threads between the user and the potential participant. In some examples, an opt-in status of the potential participant to an interaction platform may be withheld from the user.

A corresponding system may include at least one physical processor and physical memory comprising computer-executable instructions that, when executed by the physical processor, may cause the physical processor to: receive an input from a user identifying specified persons that are to be included in a concealed list of persons. The specified persons may be unaware of their inclusion in the concealed list of persons. The physical processor may further generate the concealed list of persons which includes those specified persons identified in the input received from the user and determine that a potential participant from the user's concealed list of persons has selected the user in a corresponding concealed list of persons that belongs to the potential participant. The physical processor may, in response to the determination, create a private conversation instance that is unique to the user and the potential participant. The generated private conversation instance may include an interaction interface that allows the user and the potential participant to interact in a confidential manner.

A non-transitory computer-readable medium may also be provided which includes one or more computer-executable instructions that, when executed by at least one processor of a computing device, cause the computing device to receive an input from a user identifying specified persons that are to be included in a concealed list of persons. The specified persons may be unaware of their inclusion in the concealed list of persons. The physical processor may further generate the concealed list of persons which includes those specified persons identified in the input received from the user and determine that a potential participant from the user's concealed list of persons has selected the user in a corresponding concealed list of persons that belongs to the potential participant. The physical processor may, in response to the determination, create a private conversation instance that is unique to the user and the potential participant. The generated private conversation instance may include an interaction interface that allows the user and the potential participant to interact in a confidential manner.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to create a private conversation instance, use the result of the transformation to facilitate interaction between parties, and store the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. A computer-implemented method performed by a hardware processor comprising:
    generating a concealed list of persons that includes one or more selected persons that are potential matches for a user;
    indicating, via a user interface, to the potential participant that their interest in the user will only be made known to the user if the potential participant selects the user as part of their corresponding concealed list of persons;
    determining that the potential participant from the concealed list of persons has selected the user in their corresponding concealed list of persons selected by the potential participant; and
    in response to the determination, creating a private conversation instance for the user and the potential participant that includes an interaction interface that allows the user and the potential participant to interact in a confidential manner, wherein the private conversation instance provides access to a user profile associated with the potential participant, and wherein the interaction interface is created separately from at least one existing conversation thread between the user and the potential participant.

2. The computer-implemented method of claim 1, further comprising receiving an input from a user identifying one or more specified persons that are to be included in the concealed list of persons, the specified persons being unaware of their inclusion in the concealed list of persons.

3. The computer-implemented method of claim 1, further comprising notifying the user that the potential participant has selected the user in the potential participant's concealed list of persons without revealing the identity of the potential participant.

4. The computer-implemented method of claim 1, further comprising notifying the user that the potential participant has selected the user in the potential participant's concealed list of persons, wherein the notification reveals the identity of the potential participant.

5. The computer-implemented method of claim 1, further comprising notifying the user that the potential participant has selected the user in the potential participant's concealed list of persons before the user saves the potential participant to the user's concealed list of persons.

6. The computer-implemented method of claim 1, further comprising notifying the user that the potential participant has selected the user in the potential participant's concealed list of persons after the user has saved the potential participant to the user's concealed list of persons.

7. The computer-implemented method of claim 1, wherein one or more specified persons that are included in the user's concealed list of persons are selected from among persons that are social media friends with the user.

8. The computer-implemented method of claim 1, wherein the user is limited to adding only a specified maximum number of persons to the user's concealed list of persons within a specified timeframe.

9. The computer-implemented method of claim 1, wherein the potential participants opt in to a specified application feature before being selectable as a person in the user's concealed list of persons.

10. The computer-implemented method of claim 1, wherein the interaction interface of the private conversation instance comprises at least one of a text-based chat interface or a video-based chat interface.

11. The computer-implemented method of claim 1, wherein the interaction interface is automatically generated upon mutual selection by the user and the potential participant.

12. A system comprising:
    at least one physical processor;
    physical memory comprising computer-executable instructions that, when executed by the physical processor, cause the physical processor to:
        generate a concealed list of persons that includes one or more selected persons that are potential matches for a user;
        indicate, via a user interface, to the potential participant that their interest in the user will only be made known to the user if the potential participant selects the user as part of their corresponding concealed list of persons;
        determine that the potential participant from the concealed list of persons has selected the user in their corresponding concealed list of persons selected by the potential participant; and
        in response to the determination, create a private conversation instance for the user and the potential participant that includes an interaction interface that allows the user and the potential participant to interact in a confidential manner, wherein the private conversation instance provides access to a user profile associated with the potential participant, and wherein the interaction interface is created separately from at least one existing conversation thread between the user and the potential participant.

13. The system of claim 12, wherein the private conversation instance is ephemeral and is configured to expire after a specified amount of time.

14. The system of claim 12, further comprising notifying the potential participant that an anonymous user has added the potential participant to a concealed list of persons.

15. The system of claim 12, wherein an input from the user identifying one or more specified persons that are to be included in the concealed list of persons expires after a specified period of time, such that one or more of the specified persons are removed from the user's concealed list of persons.

16. The system of claim 12, wherein access to the user's concealed list of persons is initially provided in a first manner and transitions after a specified time period to a second, different manner.

17. The system of claim 12, wherein the interaction interface is automatically generated upon mutual selection by the user and the potential participant.

18. The system of claim 12, wherein the potential participants opt in to a specified application feature before being selectable as a person in the user's concealed list of persons.

19. The system of claim 12, wherein an opt-in status of the potential participant to an interaction platform is withheld from the user.

20. A non-transitory computer-readable medium comprising one or more computer-executable instructions that, when executed by at least one processor of a computing device, cause the computing device to:
- generate a concealed list of persons that includes one or more selected persons that are potential matches for a user;
- indicating, via a user interface, to the potential participant that their interest in the user will only be made known to the user if the potential participant selects the user as part of their corresponding concealed list of persons;
- determine that the potential participant from the concealed list of persons has selected the user in their corresponding concealed list of persons selected by the potential participant; and
- in response to the determination, create a private conversation instance for the user and the potential participant that includes an interaction interface that allows the user and the potential participant to interact in a confidential manner, wherein the private conversation instance provides access to a user profile associated with the potential participant, and wherein the interaction interface is created separately from at least one existing conversation thread between the user and the potential participant.

* * * * *